(12) United States Patent
Kuwabara et al.

(10) Patent No.: US 12,458,287 B2
(45) Date of Patent: Nov. 4, 2025

(54) WEARABLE SENSOR DEVICE

(71) Applicant: NTT, Inc., Tokyo (JP)

(72) Inventors: Kei Kuwabara, Tokyo (JP); Akio Tokura, Tokyo (JP); Hiroto Matsuoka, Tokyo (JP); Takako Ishihara, Tokyo (JP); Takayuki Ogasawara, Tokyo (JP); Yuki Hashimoto, Tokyo (JP); Kenichi Matsunaga, Tokyo (JP); Toshiki Wada, Tokyo (JP); Hiroyoshi Togo, Tokyo (JP)

(73) Assignee: NTT, Inc., Tokyo (JP)

( * ) Notice: Subject to any disclaimer, the term of this patent is extended or adjusted under 35 U.S.C. 154(b) by 790 days.

(21) Appl. No.: 17/773,913

(22) PCT Filed: Nov. 6, 2019

(86) PCT No.: PCT/JP2019/043410
§ 371 (c)(1),
(2) Date: May 3, 2022

(87) PCT Pub. No.: WO2021/090385
PCT Pub. Date: May 14, 2021

(65) Prior Publication Data
US 2022/0361815 A1 Nov. 17, 2022

(51) Int. Cl.
*A61B 5/00* (2006.01)
*A61B 5/11* (2006.01)
*A61B 5/25* (2021.01)

(52) U.S. Cl.
CPC .......... *A61B 5/6801* (2013.01); *A61B 5/0002* (2013.01); *A61B 5/11* (2013.01);
(Continued)

(58) Field of Classification Search
None
See application file for complete search history.

(56) References Cited

U.S. PATENT DOCUMENTS

2008/0214900 A1* 9/2008 Fennell ................. G16H 40/63
600/300
2009/0043531 A1* 2/2009 Kahn ..................... A61B 5/112
702/149
(Continued)

FOREIGN PATENT DOCUMENTS

JP 2007271413 A 10/2007
JP 6163637 B2 9/2014
(Continued)

OTHER PUBLICATIONS

Kwon et al. "Evaluation of the Wet Bulb Globe Temperature (WBGT) Index for Digital Fashion Application in Outdoor Environments", J Ergonomics Society of Korea (JESK), 2017, 36(1), pp. 23-36.

*Primary Examiner* — Aurelie H Tu
(74) *Attorney, Agent, or Firm* — Slater Matsil, LLP

(57) ABSTRACT

A wearable sensor device includes a temperature and humidity sensor that measures ambient environmental information around a living body, a snap button connected to a bioelectrode, a biological information measurement unit that measures biological information, an inertial sensor that measures inertial information, a calculation unit that calculates a biological feature amount based on the biological information and calculates an inertial feature amount based on the inertial information, and a wireless communication unit that transmits the biological information, the inertial information, the biological feature amount, the inertial feature amount, and the environmental information to the outside.

14 Claims, 5 Drawing Sheets

(52) U.S. Cl.
CPC ........ *A61B 5/25* (2021.01); *A61B 2560/0252* (2013.01); *A61B 2562/0219* (2013.01); *A61B 2562/029* (2013.01)

(56) References Cited

U.S. PATENT DOCUMENTS

| | | |
|---|---|---|
| 2009/0076397 A1 | 3/2009 | Libbus et al. |
| 2014/0273858 A1* | 9/2014 | Panther .................. H04B 5/72 455/41.2 |
| 2016/0018791 A1 | 1/2016 | Germiquet et al. |
| 2017/0128722 A1 | 5/2017 | Perez |
| 2017/0224244 A1 | 8/2017 | Kuwabara et al. |

FOREIGN PATENT DOCUMENTS

| | | |
|---|---|---|
| JP | 2018191787 A | 12/2018 |
| KR | 20160040773 A | 4/2016 |
| WO | 2014151925 A1 | 9/2014 |
| WO | 2016024495 A1 | 2/2016 |

* cited by examiner

WEARABLE SENSOR DEVICE

CROSS-REFERENCE TO RELATED APPLICATIONS

This application is a national phase entry of PCT Application No. PCT/JP2019/043410, filed on Nov. 6, 2019, which application is hereby incorporated herein by reference.

TECHNICAL FIELD

The present invention relates to a wearable sensor device that is attached to a wear or a living body to measure biological information, ambient environmental information around the living body, and a kinetic condition of the living body.

BACKGROUND

It is important to monitor environmental information for physical condition management such as prevention of heat stroke in hot weather.

For example, a heat index meter conventionally used for preventing heat stroke measures a black bulb temperature, a wet bulb temperature, and a dry bulb temperature to obtain a heat index (see Non-Patent Literature 1). Non-Patent Literature 1 discloses a method using the heat index as a guideline for action, such as avoiding going out or strenuous work when the heat index is relatively high.

Conventional heat index meters are generally configured as relatively large devices and it is difficult to place them in any given location. For example, the heat index released by the Ministry of the Environment is a value that represents a wide area.

However, the heat load actually experienced by an individual is greatly affected by the local environment. For example, the environment varies greatly depending on where each person is, such as outdoors or indoors, in sunshine or shade, and on lawn or concrete. Moreover, even in the same place, the influence of radiation from, for example, the ground differs greatly from a tall adult to a short child. Furthermore, the environment around a human body changes greatly depending on the clothes that the person is wearing, the kinetic condition, and the sweating condition.

Therefore, a method is conceivable in which a person who wants to manage his or her physical condition carries or wears an environmental sensor to monitor the environment around the human body. However, conventional environmental sensors have problems such as inconvenience in carrying and the inability to perform accurate measurement when sweat adheres to the sensor.

It is also important to monitor biological information and a kinetic condition of a person as well as environmental information in order to manage physical condition such as prevention of heat stroke in hot weather.

For example, if the heart rate one minute after the peak work intensity exceeds 120, the risk of heat stroke is high, and it is recommended to take a break from work in the heat.

As a sensor capable of monitoring the heart rate and the kinetic condition of a person, for example, a wristband-type wearable sensor is commercially available. However, this wearable sensor has the following problems. In order to monitor the biological information and the kinetic condition of a person in addition to the ambient environmental information around a human body, it is necessary to carry, wear, and charge the environmental sensor and the wearable sensor. Thus, it is troublesome and difficult to continuously monitor the ambient environmental information around a human body, the biological information, and the kinetic condition.

CITATION LIST

Non-Patent Literature

Non-Patent Literature 1: JuYoun Kwon, Ken Parsons, "Evaluation of the Wet Bulb Globe Temperature (WBGT) Index for Digital Fashion Application in Outdoor Environments", Journal of the Ergonomics Society of Korea, 36(1), pp. 23-36, 2017.

SUMMARY

Technical Problem

Embodiments of the present invention have been made to solve the above-mentioned problems, and an object of embodiments of the present invention is to enable ambient environmental information around a living body, biological information, and a kinetic condition of the living body to be measured easily.

Means for Solving the Problem

A wearable sensor device of embodiments of the present invention includes: an environmental sensor configured to measure ambient environmental information around a living body; a first conductive portion configured to be connected to a bioelectrode that is in contact with a body surface of the living body or be in contact with the body surface of the living body; a biological information measurement unit configured to measure biological information via the first conductive portion; an inertial sensor configured to measure inertial information of the living body; a calculation unit configured to calculate a biological feature amount based on the biological information and calculate an inertial feature amount based on the inertial information; and a wireless communication unit configured to wirelessly transmit the biological information, the inertial information, the biological feature amount, the inertial feature amount, and the environmental information to an external device, wherein the biological information measurement unit, the inertial sensor, the calculation unit, and the wireless communication unit are provided in a sealed housing, the environmental sensor is provided on an outer wall surface of the housing or is provided to be separated from the outer wall surface, and a part of the first conductive portion is exposed to outside of the housing for connection to the bioelectrode or for contact with the body surface of the living body.

Effects of Embodiments of the Invention

According to embodiments of the present invention, the biological information measurement unit, the inertial sensor, the calculation unit, and the wireless communication unit are provided in a sealed housing, the environmental sensor is provided on the outer wall surface of the housing or is separated from the outer wall surface, and a part of the first conductive portion is exposed to the outside of the housing for connection to the bioelectrode or contact with the body surface of the living body. As a result, the ambient environmental information around the living body, the biological information, and the inertial information indicating the kinetic condition of the living body can be measured easily and continuously by one compact and thin device that can easily be worn on the living body without being affected by adhesion of sweat, rain, or the like.

DETAILED DESCRIPTION OF ILLUSTRATIVE EMBODIMENTS

Figure 1:
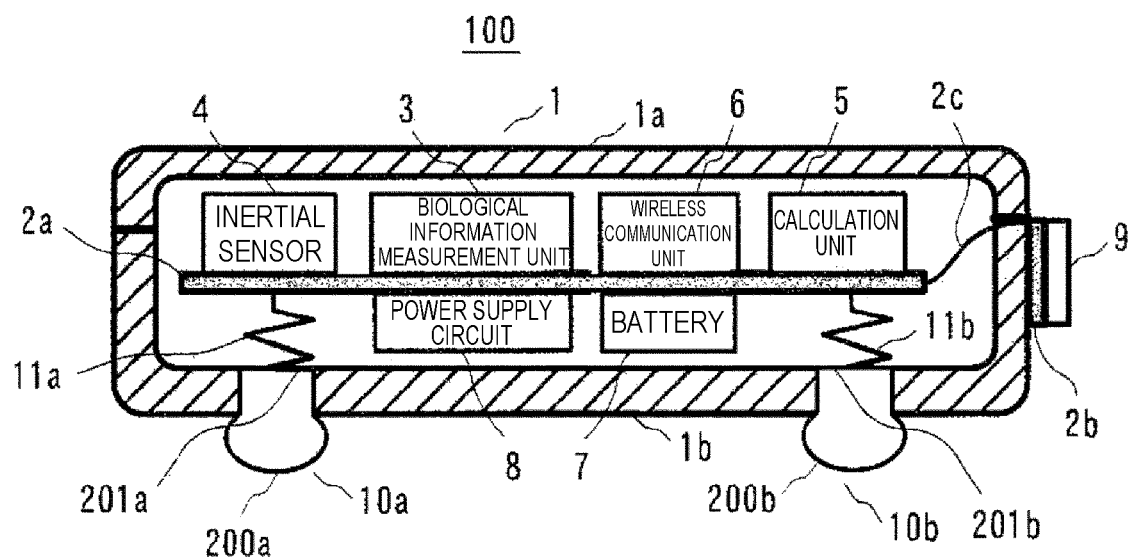
FIG. 1 is a diagram illustrating a configuration of a wearable sensor device according to an embodiment of the present invention.

Hereinafter, an embodiment of the present invention will be described in detail with reference to the drawings. FIG. 1 illustrates a configuration of a wearable sensor device according to the embodiment. A wearable sensor device 100 includes a rigid substrate 2a and a flexible substrate 2c for connecting a circuit mounted on the rigid substrate 2a and a temperature and humidity sensor described later in a sealed housing 1.

A biological information measurement unit 3, an inertial sensor 4, a calculation unit 5, a wireless communication unit 6, a battery 7, and a power supply circuit 8 are mounted on the rigid substrate 2a. The biological information measurement unit 3 measures biological information. The inertial sensor 4 measures inertial information. The calculation unit 5 calculates a biological feature amount based on the biological information and calculates an inertial feature amount based on the inertial information. The wireless communication unit 6 wirelessly transmits the biological information, the inertial information, the biological feature amount, the inertial feature amount, and environmental information measured by a temperature and humidity sensor 9 described later to an external device. The power supply circuit 8 supplies a power supply voltage to the circuit on the rigid substrate 2a and the temperature and humidity sensor 9 described later using the voltage of the battery 7 as an input.

The temperature and humidity sensor 9 (environmental sensor) is provided on the side surface of an outer wall of the housing 1. Two conductive snap buttons 10a and 10b (first conductive portions) are provided on the lower surface of the outer wall of the housing 1. As will be described later, the snap buttons 10a and 10b can be connected to external bioelectrodes via wear-side snap buttons, and perform a function of transmitting bioelectric signals acquired by the bioelectrodes to the biological information measurement unit 3. Naturally, the number of snap buttons 10a and 10b may be at least two, and may be three or more depending on the number of bioelectrodes to be connected.

The housing 1 is hermetically sealed and has waterproofness so that liquids such as sweat and rain do not enter from the outside. The housing 1 includes a resin-made upper lid 1a, for example, and similarly a resin-made lower lid 1b. As a well-known method for ensuring the waterproofness of the housing 1, a method of screwing the upper lid 1a to the lower lid 1b with an O-ring inserted between the upper lid 1a and the lower lid 1b, a method of fixing the upper lid 1a and the lower lid 1b together with an adhesive, a method of ultrasonic-bonding the upper lid 1a and the lower lid 1b, and the like may be used.

The temperature and humidity sensor 9 is mounted on a rigid substrate 2b. The rigid substrate 2b is fixed to the side surface of the outer wall of the housing 1. By providing a waterproof moisture-permeable film or the like on the surface of the temperature and humidity sensor 9, it is possible to prevent damage when sweat, rain, or the like adheres to the surface of the temperature and humidity sensor 9. The temperature and humidity sensor 9 mounted on the rigid substrate 2b is electrically connected to the calculation unit 5 and the power supply circuit 8 inside the housing 1 via a flexible wiring and a wiring on the rigid substrate 2a. As the flexible wiring, for example, the flexible substrate 2c can be used.

The rigid substrates 2a and 2b and the flexible substrate 2c are integrated to form a rigid flexible substrate. As described above, the biological information measurement unit 3, the inertial sensor 4, the calculation unit 5, the wireless communication unit 6, the battery 7, and the power supply circuit 8 are mounted on the rigid substrate 2a, and the temperature and humidity sensor 9 is mounted on the rigid substrate 2b. The rigid substrate 2a and the rigid substrate 2b are electrically connected by the flexible substrate 2c.

The rigid substrate 2a is fixed to an inner wall surface of the lower lid 1b. The rigid substrate 2b is fixed to the side surface of an outer wall of the lower lid 1b. With the rigid substrates 2a and 2b fixed to the lower lid 1b, the flexible substrate 2c is sandwiched between the upper lid 1a and the lower lid 1b, and the upper lid 1a and the lower lid 1b are attached by methods such as screwing, adhesion, or ultrasonic bonding.

In this way, temperature and humidity data (environmental information) measured by the temperature and humidity sensor 9 on the outer side of the sealed housing 1 can be transmitted to the calculation unit 5 inside the housing 1 and processed by the calculation unit 5.

In the embodiment, the temperature and humidity sensor 9 having a built-in AD converter is used, and the measured value of the temperature and humidity is converted into digital data by the AD converter and transmitted to the calculation unit 5.

The configuration of the temperature and humidity sensor 9 is not limited to this embodiment, and an analog-output temperature and humidity sensor may be used. In this case, an analog signal processing unit or an AD converter may be mounted on the rigid substrate 2a, and the analog signals output from the temperature and humidity sensor 9 may be processed (for example, amplified) by the analog signal processing unit and then converted to digital data by the AD converter and passed to the calculation unit 5.

The metal-made snap buttons 10a and 10b are machined in advance as individual parts. Then, the snap buttons 10a and 10b are integrated with the lower lid 1b by an insert molding method so that, when the resin-made lower lid 1b is manufactured, convex portions 200a and 200b protrude from the lower surface of the outer wall of the lower lid 1b, ends 201a and 201b on the opposite sides of the convex portions 200a and 200b are exposed to the inside of the lower lid 1b, and the remaining portion is surrounded by the lower lid 1b. In this way, the snap buttons 10a and 10b can be fixed to the lower lid 1b while ensuring the waterproofness of the portion to which the snap buttons 10a and 10b are fixed.

By electrically connecting the ends 201a and 201b of the snap buttons 10a and 10b exposed to the inside of the housing 1 and the biological information measurement unit 3 with a flexible wiring, the bioelectric signals acquired by the bioelectrodes can be transmitted to the biological information measurement unit 3 via the snap buttons 10a and 10b, the flexible wiring, and the wiring on the rigid substrate 2a. As the flexible wiring that connects the ends 201a and 201b of the snap buttons 10a and 10b and the rigid substrate 2a, springs 11a and 11b such as conductive leaf springs and wire springs can be used.

The rigid substrate 2a on which the biological information measurement unit 3 is mounted is arranged substantially in parallel with the lower surface of the housing 1 (the lower lid 1b), and pads electrically connected to the biological information measurement unit 3 are provided on a surface (the lower surface in FIG. 1) of the rigid substrate 2a facing the snap buttons 10a and 10b. The pads are provided as many as the snap buttons. The springs 11a and 11b may be arranged between these pads and the ends 201a and 201b of the snap buttons 10a and 10b, respectively, so that the pads and the snap buttons 10a and 10b are electrically connected.

As described above, since the biological information measurement unit 3, the inertial sensor 4, the calculation unit 5, the wireless communication unit 6, the battery 7, and the power supply circuit 8 are provided in the sealed housing 1, these parts can be prevented from being damaged by sweat, rain, or the like from the outside. Further, since the temperature and humidity sensor 9 is provided outside the housing 1 so that the temperature and humidity sensor 9 can make contact with the outside air, the ambient environmental information around a human body can be measured, and the measurement result can be processed by the calculation unit 5 inside the housing 1.

Further, since the snap buttons 10a and 10b electrically connected to the biological information measurement unit 3 inside the housing 1 are exposed to the outside of the housing 1, the snap buttons 10a and 10b can be connected to wear-side snap buttons described later, and the biological information can be measured via wear-side bioelectrodes and processed by the calculation unit 5.

Further, by arranging and combining the parts in the above-described manner, it is possible to incorporate a biological information measurement function, an inertial information measurement function, and an environmental information measurement function into the wearable sensor device 100 as thin as about 5 mm to 10 mm, for example. As a result, the embodiment can realize the wearable sensor device 100 that does not incur any discomfort to a person wearing a wear having the wearable sensor device 100 attached thereto and does not interfere with daily life or work.

Figure 2:
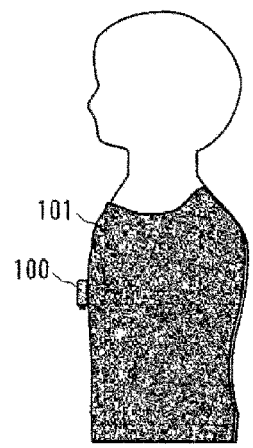
FIG. 2 is a diagram illustrating a state in which a wearer is wearing the wearable sensor device in the embodiment of the present invention.
Figure 3A:
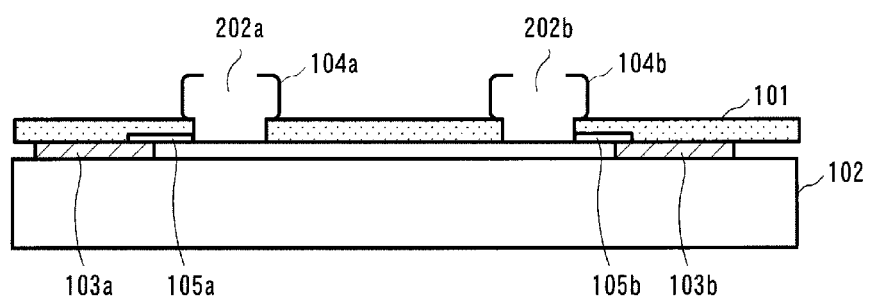
FIG. 3A is an enlarged cross-sectional view of a wear when a wearer is not wearing the wearable sensor device.
Figure 3B:
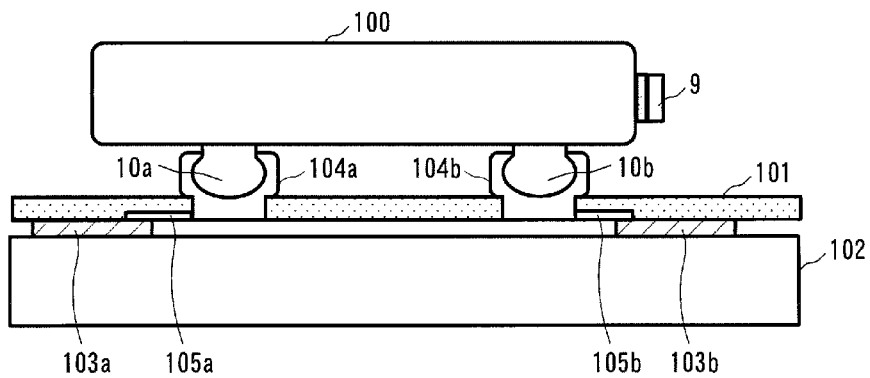
FIG. 3B is an enlarged cross-sectional view of the wear when the wearer is wearing the wearable sensor device.

FIG. 2 is a diagram illustrating a state in which the wearer wears the wearable sensor device 100. FIG. 3A is an enlarged cross-sectional view of the wear when the wearer is not wearing the wearable sensor device 100, and FIG. 3B is an enlarged cross-sectional view of the wear when the wearer is wearing the wearable sensor device 100. FIGS. 2 and 3B illustrate a state in which the wearable sensor device 100 is attached to an innerwear 101 such as a T-shirt.

The innerwear 101 is provided with bioelectrodes 103a and 103b made from conductive fibers or the like, provided on the surface in contact with a wearer's skin 102, conductive snap buttons 104a and 104b (second conductive portions) provided on the surface opposite to the surface in contact with the wearer's skin 102 so that concave portions 202a and 202b are exposed, and wirings 105a and 105b for electrically connecting the bioelectrodes 103a and 103b and the snap buttons 104a and 104b.

As the material of the innerwear 101, natural fiber materials such as cotton and wool used in ordinary clothing and synthetic fiber materials such as polyester and nylon can be used without any limitation, and the present invention is not limited to such shape and materials of the innerwear 101.

As illustrated in FIG. 3B, the convex portions of the male snap buttons 10a and 10b provided on the wearable sensor device 100 and the concave portions of the female snap buttons 104a and 104b provided on the innerwear 101 are fitted. As a result, the snap buttons 10a and 101 and the snap buttons 104a and 104b are mechanically and electrically connected, and the wearable sensor device 100 can be attached to the innerwear 101. The snap buttons 10a and 10b are electrically connected to the bioelectrodes 103a and 103b via the snap buttons 104a and 104b and the wirings 105a and 105b. By attaching the wearable sensor device 100 to the innerwear 101, the wearable sensor device 100 and the innerwear 101 form a monitoring system that measures the wearer's biological information, the ambient environmental information around the wearer, and the wearer's kinetic condition.

Since the snap buttons 10a and 10b are detachably connectable to the snap buttons 104a and 104b, when the innerwear 101 is attempted to be washed, the wearable sensor device 100 can be removed and only the innerwear 101 can be washed.

Once the wearer wears the innerwear 101, the bioelectrodes 103a and 103b come into contact with the wearer's skin 102, so that the wearer's biological information can be acquired. For example, when the bioelectrodes 103a and 103b are brought into contact with the wearer's skin 102 at two locations on the chest, the electrocardiographic waveform associated with the wearer's cardiac activity can be measured. The biological information of the present invention is not limited to electrocardiography. If the bioelectrodes 103a and 103b are placed at the locations of the wearer's arms and feet, the myography can be measured.

Naturally, the number of bioelectrodes 103a and 103b may be at least two and may be three or more.

Further, as illustrated in FIG. 3B, the temperature and humidity sensor 9 is provided on the side surface of the outer wall of the wearable sensor device 100. The lower surface of the outer wall provided with the snap buttons 10a and 10b of the wearable sensor device 100 and the side surface of the outer wall provided with the temperature and humidity sensor 9 are substantially orthogonal to each other. Therefore, when the wearable sensor device 100 is attached to the innerwear 101, the temperature and humidity sensor 9 is provided on a surface near the wearer's body surface, which is substantially orthogonal to the body surface.

If the temperature and humidity sensor 9 is provided on the same surface as the snap buttons 10*a* and 10*b* of the wearable sensor device 100, when the wearable sensor device 100 is attached to the innerwear 101, the temperature and humidity sensor 9 is arranged in a narrow space sandwiched between the innerwear 101 and the wearable sensor device 100. The temperature and humidity sensor 9 arranged in such a narrow space will measure information different from the original ambient environmental information around the wearer.

Further, if the temperature and humidity sensor 9 is provided on a surface (the upper surface in FIGS. 1 and 3B) of the wearable sensor device 100 facing the snap buttons 10*a* and 10*b*, when the wearable sensor device 100 is attached to the innerwear 101, the wearable sensor device 100 is arranged between the wearer's body surface or innerwear 101 and the temperature and humidity sensor 9. In this case, the airflow between the wearer's body surface and the temperature and humidity sensor 9 is blocked by the wearable sensor device 100. Therefore, the temperature and humidity sensor 9 measures information different from the original ambient environmental information around the wearer.

As in the embodiment, by providing the temperature and humidity sensor 9 on the side surface of the outer wall substantially orthogonal to the lower surface of the outer wall of the housing 1 provided with the snap buttons 10*a* and 10*b* of the wearable sensor device 100, the temperature and humidity sensor 9 is provided at a position where the airflow between the wearer's body surface and the outside air is not blocked. As a result, the temperature and humidity sensor 9 can measure the original ambient environmental information around the wearer.

Next, the circuit configuration of the wearable sensor device 100 will be described with reference to FIG. 4. In the embodiment, the biological information measurement unit 3, the inertial sensor 4, and the temperature and humidity sensor 9 are connected to the calculation unit 5.

The calculation unit 5 includes a biological feature amount calculation unit 50 that calculates a biological feature amount based on biological information, an inertial feature amount calculation unit 51 that calculates an inertial feature amount based on inertial information, and a memory 52 for storing information.

The biological feature amount calculation unit 50 of the calculation unit 5 performs digital filtering processing on the wearer's electrocardiographic waveform measured by the biological information measurement unit 3, for example, extracts R waves from the filtered electrocardiographic waveform, and calculates the biological feature amount such as RRI (RR Interval) which represents the interval between R waves and a heart rate.

The inertial sensor 4 measures inertial information. Examples of the inertial information include a 3-axis acceleration and a 3-axis angular acceleration. The inertial feature amount calculation unit 51 of the calculation unit 5 calculates an inertial feature amount such as, for example, the number of steps or posture of the wearer based on the 3-axis acceleration waveform and the 3-axis angular acceleration waveform measured by the inertial sensor 4.

The wireless communication unit 6 wirelessly transmits data such as electrocardiographic waveform data, 3-axis acceleration waveform data, 3-axis angular acceleration waveform data, biological feature amount data, inertial feature amount data, and temperature and humidity data from an antenna 60 to an external device. The electrocardiographic waveform data is measured by the biological information measurement unit 3. The 3-axis acceleration waveform data is measured by the inertial sensor 4. The biological feature amount data is calculated by the calculation unit 5. The temperature and humidity data is measured by the temperature and humidity sensor 9. An example of a destination external device is a smartphone possessed by the wearer.

Compared with the case where a plurality of calculation units 5 and a plurality of wireless communication units 6 are provided, when a plurality of pieces of sensor information are processed in one calculation unit 5 and the information is transmitted to the outside by one wireless communication unit 6, the power consumption of the wearable sensor device 100 can be reduced, and a continuous operation for a long time can be performed using a smaller and lighter battery 7. As a result, it is possible to improve the wearing feeling when wearing the wearable sensor device 100, reduce the nuisance of frequent charging, and easily and continuously monitor biological information, environmental information, and inertial information.

Figure 4:
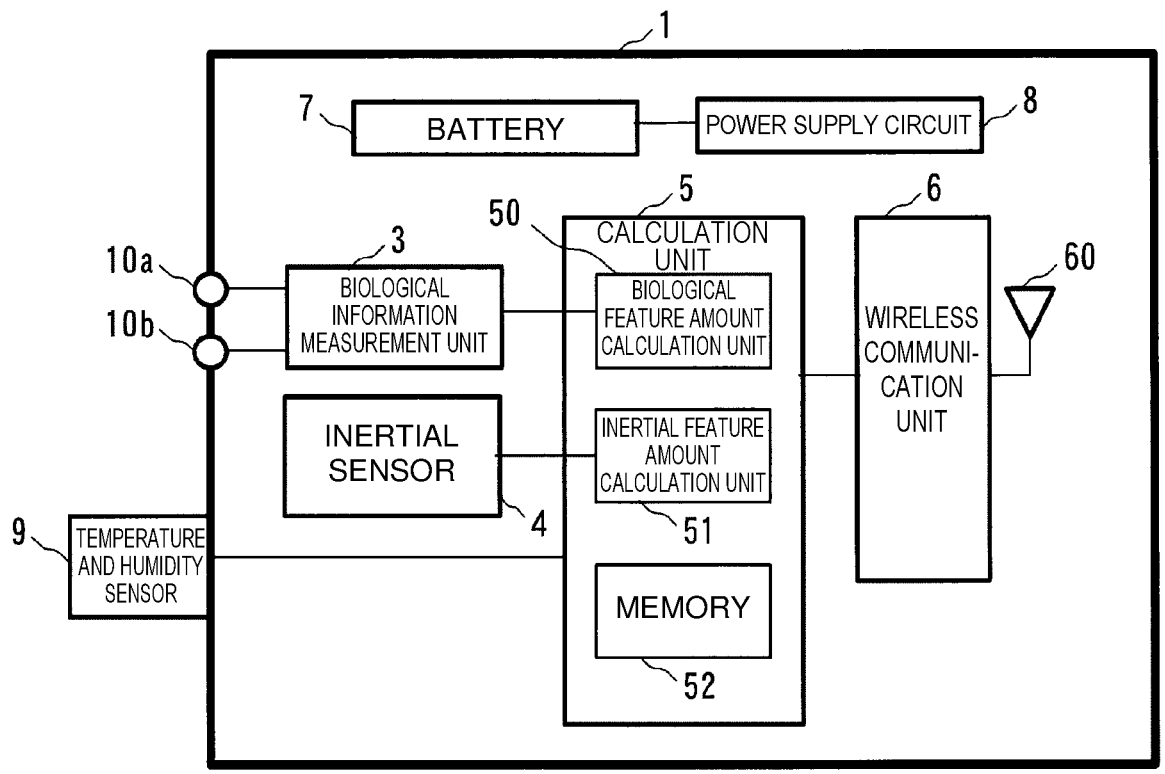
FIG. 4 is a block diagram illustrating a circuit configuration of the wearable sensor device according to the embodiment of the present invention.

Although the calculation unit 5 and the wireless communication unit 6 are described as separate blocks in FIG. 4, one semiconductor chip having the functions of the calculation unit 5 and the wireless communication unit 6 may be used.

Next, a method of transmitting waveform data and feature amount data to the outside will be described. As described above, the wearable sensor device 100 obtains a plurality of types of waveform data and a plurality of types of feature amount data. These waveform data and feature amount data have different required sampling intervals and allowable delay times.

For example, electrocardiographic waveform data or myographic waveform data generally requires a relatively short sampling interval of about 1 ms to 5 ms. Further, acceleration waveform data or angular acceleration waveform data requires a sampling interval of about 10 ms to 50 ms and a short delay time.

On the other hand, temperature and humidity data which changes relatively gradually allows a long sampling interval of about 1 second to 100 seconds. When a plurality of types of data such as waveform data and feature amount data are individually transmitted to an external device, there are problems that the proportion of overheads in wireless communication packets increases and the frequency of communication increases, resulting in reduced communication efficiency. Further, there is a problem that a large battery is required because the power consumption of the wearable sensor device 100 increases.

In addition, if all types of data are stored in one packet and transmitted according to the data with a short sampling interval, data such as temperature and humidity data with a long sampling interval will be transmitted more frequently than necessary, which results in reduced communication efficiency. On the other hand, if all types of data are stored in one packet and transmitted according to the data with a long sampling interval, there is a problem that a large delay occurs in the data that requires a short delay time.

In order to solve the above-mentioned problems, in the embodiment, the electrocardiographic waveform data, the 3-axis acceleration waveform data, and the 3-axis angular acceleration waveform data, which require relatively high-frequency data, are aggregated and transmitted in a first packet P1. In addition, biological feature amount data (RRI and heart rates), inertial feature amount data (steps and posture), and temperature and humidity data, which do not necessarily require high-frequency data, are aggregated and transmitted in a second packet P2.

Figure 5A:
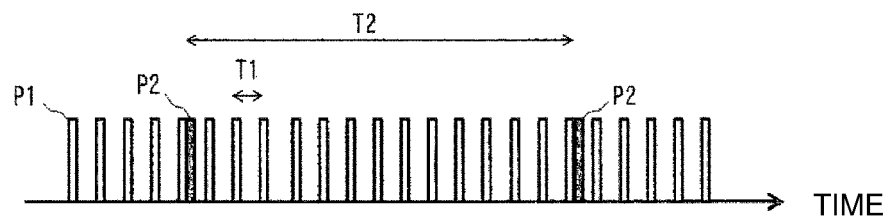
FIG. 5A is a diagram illustrating transmission intervals of a first packet and a second packet according to the embodiment of the present invention.
Figure 5B:
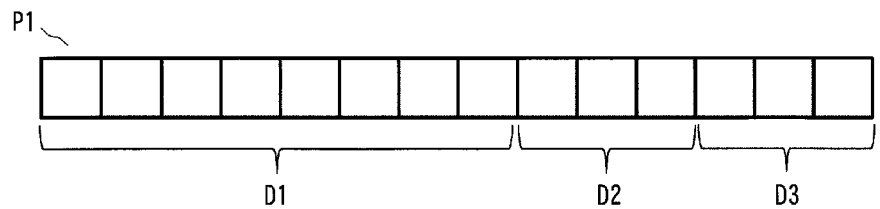
FIG. 5B is a diagram illustrating the format of the first packet according to the embodiment of the present invention.
Figure 5C:
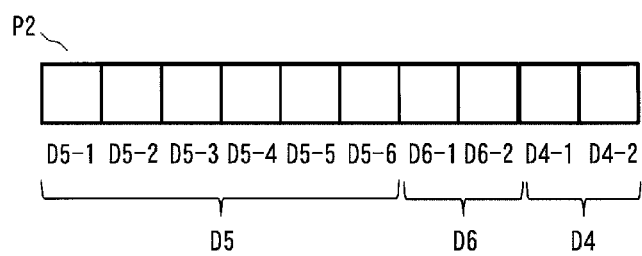
FIG. 5C is a diagram illustrating the format of the second packet according to the embodiment of the present invention.

FIG. 5A is a diagram illustrating transmission intervals of the first packet P1 and the second packet P2. FIG. 5B is a diagram illustrating the format of the first packet P1. FIG. 5C is a diagram illustrating the format of the second packet P2. In FIG. 5A, T1 is the transmission interval of the first packet P1, and T2 is the transmission interval of the second packet P2.

The wireless communication unit 6 transmits the first packet P1 at intervals of, for example, about 10 ms to 100 ms. The wireless communication unit 6 stores electrocardiographic waveform data D1 (or myographic waveform data) measured at intervals of about 1 ms to 10 ms and 3-axis acceleration waveform data D2 and 3-axis angular acceleration waveform data D3 measured at intervals of about 10 ms to 100 ms in the first packet P1 and transmits the first packet P1.

By setting the sampling interval of the 3-axis acceleration and 3-axis angular acceleration to n times the electrocardiographic or myographic sampling interval (n is an integer of 2 or more), the 3-axis acceleration waveform data D2 and the 3-axis angular acceleration waveform data D3 can be efficiently contained in a single packet.

For example, by setting the sampling interval of the electrocardiogram to 5 ms, the sampling interval of the 3-axis acceleration and the 3-axis angular acceleration to 40 ms, and the transmission interval T1 of the first packet P1 to 40 ms, the electrocardiographic waveform data D1, the 3-axis acceleration waveform data D2, and the 3-axis angular acceleration waveform data D3 can be stored in one packet and transmitted efficiently.

At this time, the calculation unit 5 temporarily stores the electrocardiographic waveform data D1 measured by the biological information measurement unit 3 in the memory 52, and performs digital filtering processing on the electrocardiographic waveform data D1 and biological feature amount calculation processing in synchronization with the sampling timing of the 3-axis acceleration and the 3-axis angular acceleration.

Further, the wireless communication unit 6 transmits the second packet P2 at intervals of, for example, about 1 second to 100 seconds. The wireless communication unit 6 stores temperature and humidity data D4 measured at intervals of about 1 second to 100 seconds, and biological feature amount data D5 and inertial feature amount data D6 calculated at intervals of about 1 second to 100 seconds in the second packet P2 and transmits the second packet P2. In FIG. 5C, D4-1 is temperature data and D4-2 is humidity data. D5-1 is heart rate data, and D5-2 to D5-6 are RRI data. D6-1 is step count data, and D6-2 is posture data. The posture data is, for example, roll angle and pitch angle data.

The sampling interval of temperature and humidity is set to n times the sampling interval of the 3-axis acceleration or the 3-axis angular acceleration (n is an integer of 2 or more). The calculation unit 5 temporarily stores the 3-axis acceleration waveform data D2 and the 3-axis angular acceleration waveform data D3 measured by the inertial sensor 4 in the memory 52, and performs inertial feature amount calculation processing in synchronization with the sampling timing of temperature and humidity.

The data interval of the biological feature amount and the inertial feature amount is an integer multiple of 1 or more of the sampling interval of temperature and humidity.

In the embodiment, the processing timing of the calculation unit 5 can be coordinated with the sampling timing of 3-axis acceleration and 3-axis angular acceleration and the sampling timing of temperature and humidity, and the calculation unit 5 can be suspended at times other than these timings. Therefore, it is possible to further reduce the power consumption.

In the above example, the electrocardiographic waveform may be sampled at intervals of 1 ms, for example, to extract R waves with high temporal resolution, and the electrocardiographic waveform data may be down-sampled at intervals of 5 ms when wirelessly transmitted to the outside.

In the embodiment, an example in which the snap buttons 10a, 10b, 104a, 104b are used as means for attaching the wearable sensor device 100 to the innerwear 101 has been illustrated. However, the present invention is not limited thereto, and for example, attachment means such as a magnet, a clip, the Magic Tape (registered trademark), or the like may be used. The wearable sensor device 100 can be attached to the innerwear 101 by using these attachment means.

Further, a patch or the like that can be adhered to the skin may be provided on the lower surface of the wearable sensor device 100 so that the wearable sensor device 100 can be directly attached to the wearer's body surface instead of a wear. In this case, instead of the snap buttons 10a and 10b, an electrode having a shape suitable for contact with the wearer's skin is provided as the conductive portion.

Further, the wearable sensor device 100 may be integrated with a wear rather than being detachably attached thereto.

Further, the wearable sensor device 100 of the embodiment can be attached to various wears such as a T-shirt, a tank top, a belly band, a belt around the chest, and pants.

Further, since the wearable sensor device 100 of the embodiment is intended to monitor a living body, it may be worn on an animal or the like without being limited to a person.

Further, in the embodiment, an example of a temperature and humidity sensor is illustrated as an environmental sensor. However, the present invention is not limited thereto, and an environmental sensor such as a temperature sensor alone, a humidity sensor alone, a barometric pressure sensor, or a gas sensor may be used.

Further, a memory capable of storing waveform data and feature amount data may be further provided so that the data stored in the memory can be read from the wireless communication unit 6.

Further, in the embodiment, a structure in which the rigid substrate 2a and the flexible substrate 2b are covered and sealed with the box-shaped housing 1 is illustrated as an example, but the present invention is not limited thereto. For example, a resin or the like may be poured around the rigid substrate 2a, the flexible substrate 2b, the springs 11a and 11b, and the snap buttons 10a and 10b (or electrodes) to cure the resin and achieve sealing.

Figure 6:
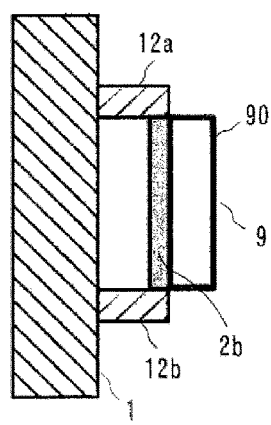
FIG. 6 is a diagram illustrating another method of fixing a temperature and humidity sensor according to the embodiment of the present invention.

Further, in the embodiment, the temperature and humidity sensor 9 is mounted on the rigid substrate 2b, and the rigid substrate 2b is fixed to the outer wall surface of the housing 1, but the present invention is not limited thereto. As illustrated in FIG. 6, the temperature and humidity sensor 9 may be provided to be separated from the outer wall surface of the housing 1 so that the sensor surface 90 of the temperature and humidity sensor 9 is parallel to the outer wall surface.

Specifically, support members 12a and 12b that support the rigid substrate 2b may be provided on the outer wall surface of the housing 1 so that the rigid substrate 2b on which the temperature and humidity sensor 9 is mounted is provided on the outer wall surface of the housing 1 with a space therebetween. In this way, the temperature and humidity sensor 9 can be provided to be separated from the outer wall surface by the support members 12a and 12b.

Figure 7:
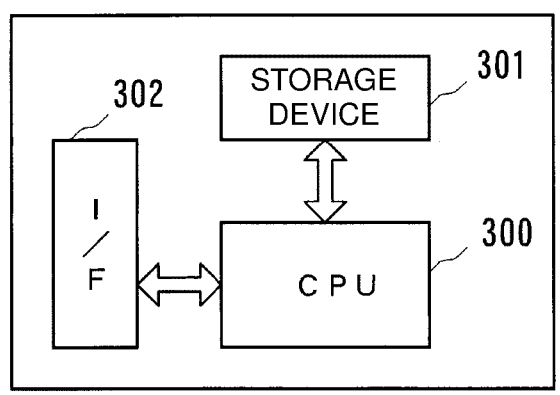
FIG. 7 is a block diagram illustrating a configuration example of a computer that realizes the wearable sensor device according to the embodiment of the present invention.

Among the configurations of the wearable sensor device 100 described in the embodiment, the software functions of the calculation unit 5 and the wireless communication unit 6 can be realized by a computer provided with a CPU (Central Processing Unit), a storage device, and an interface, and a program that controls these hardware resources. A configuration example of this computer is illustrated in FIG. 7.

The computer includes a CPU 300, a storage device 301, and an interface device (I/F) 302. The interface device 302 is connected to hardware components including the biological information measurement unit 3, the inertial sensor 4, the temperature and humidity sensor 9, and the wireless communication unit 6. In such a computer, a program for realizing the monitoring method of embodiments of the present invention is stored in the storage device 301. The CPU 300 executes the process described in the embodiment according to the program stored in the storage device 301.

INDUSTRIAL APPLICABILITY

Embodiments of the present invention can be applied to a technique for measuring biological information, environmental information, and a kinetic condition.

REFERENCE SIGNS LIST

1 Housing
1a Upper lid
1b Lower lid
2a, 2b Rigid substrate
2c Flexible substrate
3 Biological information measurement unit
4 Inertial sensor
5 Calculation unit
6 Wireless communication unit
7 Battery
8 Power supply circuit
9 Temperature and humidity sensor
10a, 10b, 104a, 104b Snap button
11a, 11b Spring
12a, 12b Support member
50 Biological feature amount calculation unit
51 Inertial feature amount calculation unit
52 Memory
100 Wearable sensor device
101 Innerwear
103a, 103b, Bioelectrode
105a, 105b Wiring.

The invention claimed is:

1. A wearable sensor device comprising:
an environmental sensor configured to measure ambient environmental information around a living body;
a first conductive portion configured to be connected to a bioelectrode that is in contact with a body surface of the living body or to be in contact with the body surface of the living body;
a biological information measurement device configured to measure biological information via the first conductive portion;
an inertial sensor configured to measure inertial information of the living body;
a calculation device configured to calculate a biological feature amount based on the biological information and to calculate an inertial feature amount based on the inertial information; and
a wireless communication device configured to wirelessly transmit the biological information, the inertial information, the biological feature amount, the inertial feature amount, and the environmental information to an external device, wherein:
the biological information measurement device, the inertial sensor, the calculation device, and the wireless communication device are provided in a sealed housing;
the environmental sensor is provided on an outer wall surface of the sealed housing or is provided to be separated from the outer wall surface to outside the housing, the environmental sensor and the first conductive portion are provided on respective surfaces of the sealed housing that are orthogonal to each other; and
a part of the first conductive portion is exposed to outside of the sealed housing for connection to the bioelectrode or for contact with the body surface of the living body.

2. The wearable sensor device according to claim 1, wherein:
the wireless communication device is configured to store the biological information and the inertial information in a first packet and to transmit the first packet to the external device and to store the biological feature amount, the inertial feature amount, and the environmental information in a second packet and to transmit the second packet to the external device; and
a transmission interval of the second packet is longer than a transmission interval of the first packet.

3. The wearable sensor device according to claim 1, wherein:
a sampling interval of the inertial information is an integer multiple of two or more of sampling intervals of the biological information;
a sampling interval of the environmental information is an integer multiple of two or more of the sampling intervals of the inertial information; and
a data interval of at least a portion of the biological feature amount and at least a portion of the inertial feature amount is an integer multiple of one or more of the sampling intervals of the environmental information.

4. The wearable sensor device according to claim 1, further comprising a memory for storing information, wherein:
the calculation device is configured to store the biological information measured by the biological information measurement device in the memory and to calculate the biological feature amount at a period equal to a sampling interval of the inertial information.

5. The wearable sensor device according to claim 1, further comprising a memory for storing information, wherein:
the calculation device is configured to store the inertial information measured by the inertial sensor in the memory and to calculate the inertial feature amount at a period equal to a sampling interval of the environmental information.

6. The wearable sensor device according to claim 1, wherein:
the first conductive portion is detachably connectable to a second conductive portion provided on a wear worn on the living body and is electrically connected to the bioelectrode provided on the wear when connected mechanically and electrically to the second conductive portion.

7. The wearable sensor device according to claim 1, wherein:
the first conductive portion and the biological information measurement device are connected to each other via a first flexible wiring, and the environmental sensor and the calculation device are connected to each other via a second flexible wiring.

8. A method comprising:
measuring, by an environmental sensor, ambient environmental information around a living body;
connecting a first conductive portion to a bioelectrode that is in contact with a body surface of the living body or to the body surface of the living body;
measuring, by a biological information measurement device, biological information via the first conductive portion;
measuring, by an inertial sensor, inertial information of the living body;
calculating, by a calculation device, a biological feature amount based on the biological information and calculating an inertial feature amount based on the inertial information; and
wirelessly transmitting, by a wireless communication device, the biological information, the inertial information, the biological feature amount, the inertial feature amount, and the environmental information to an external device, wherein:
the biological information measurement device, the inertial sensor, the calculation device, and the wireless communication device are provided in a sealed housing;
the environmental sensor is provided on an outer wall surface of the sealed housing or is provided to be separated from the outer wall surface to outside of the housing, the environmental sensor and the first conductive portion are provided on respective surfaces of the sealed housing that are orthogonal to each other; and
a part of the first conductive portion is exposed to outside of the sealed housing for connection to the bioelectrode or for contact with the body surface of the living body.

9. The method according to claim 8, further comprising:
storing, by the wireless communication device, the biological information and the inertial information in a first packet and transmitting the first packet to the external device; and
storing, by the wireless communication device, the biological feature amount, the inertial feature amount, and the environmental information in a second packet and transmitting the second packet to the external device, wherein a transmission interval of the second packet is longer than a transmission interval of the first packet.

10. The method according to claim 8, wherein:
a sampling intervals of the inertial information is an integer multiple of two or more of sampling intervals of the biological information;
a sampling interval of the environmental information is an integer multiple of two or more of the sampling intervals of the inertial information; and
a data interval of at least a portion of the biological feature amount and at least a portion of the inertial feature amount is an integer multiple of one or more of the sampling intervals of the environmental information.

11. The method according to claim 8, further comprising:
storing the biological information measured by the biological information measurement device in a memory; and
calculating the biological feature amount at a period equal to a sampling interval of the inertial information.

12. The method according to claim 8, further comprising:
storing the inertial information measured by the inertial sensor in a memory; and
calculating the inertial feature amount at a period equal to a sampling interval of the environmental information.

13. The method according to claim 8, wherein:
the first conductive portion is detachably connectable to a second conductive portion provided on a wear worn on the living body and is electrically connected to the bioelectrode provided on the wear when connected mechanically and electrically to the second conductive portion.

14. The method according to claim 8, wherein:
the first conductive portion and the biological information measurement device are connected to each other via a first flexible wiring, and the environmental sensor and the calculation device are connected to each other via a second flexible wiring.

* * * * *